United States Patent Office 3,166,548
Patented Jan. 19, 1965

3,166,548
CONDENSATION PRODUCTS
Willard H Kirkpatrick, Sugar Land, and Virgil L. Seale, Houston, Tex., assignors to Nalco Chemical Company, a corporation of Delaware
No Drawing. Continuation of application Ser. No. 596,816, July 10, 1956. This application Aug. 5, 1960, Ser. No. 47,608
22 Claims. (Cl. 260—97.5)

This invention relates to new and useful condensation products, more particularly condensation products of aliphatic polyamines having at least three amino groups and organic carboxy acids and to a method of producing such condensation products.

One of the objects of the invention is to provide new and useful surface active compositions which are suitable for employment in a wide variety of uses where surface activity is necessary or desirable.

Another object of the invention is to produce surface active compositions which have improved properties as compared with known surface active compositions.

A further object of the invention is to produce new and useful surface active compositions which are less expensive to manufacture than many known surface active materials.

An additional object of the invention is to provide surface active compositions which can be prepared from readily available raw materials.

Another object of the invention is to provide a method for producing compositions of te type previously described. Other objects will appear hereinafter.

These objects are accomplished in accordance with the invention by condensing aliphatic polyamines containing at least three primary and/or secondary amino groups (groups having at least one hydrogen on the amino nitrogens) and an organic carboxy acid, the proportions of the organic carboxy acid being a molar excess within the range from 1% to 40% over a 1:1 molar ratio of carboxy (COOH) in the organic carboxy acid to nitrogen (N) in the primary and secondary amine groups of the aliphatic polyamine. The excess acid in many cases probably acts as a plasticizer for the surface active mixture.

The condensation reaction should be effected under conditions facilitating the elimination of water, preferably at temperatures within the range of 165° C. to 300° C. to produce a water wettable product. The condensation is carried out until about a mole of chemically combined water has been eliminated for each mole of amino nitrogen. This excludes, of course, free water present in the reaction mixture as an impurity or diluent. We thus produce a product containing essentially no residual basic amino groups.

The nature and characteristics of the condensation products will vary depending upon the initial reactants. To a large extent the end products can be described as polyamides but the excess of the organic carboxylic acid employed in the condensation reaction gives the resultant product desirable properties not possessed by condensation products made by condensing the same reactants with an excess of the amine over the carboxylic acid.

The invention will be further illustrated by the following examples in which the quantities are stated in parts by weight unless otherwise stated.

Example I 35 parts of diethylenetriamine, 300 parts of tall oil and 205 parts of sulfur dioxide extract were placed in a glass flask provided with a stirrer and equipped with a moisture trap and return condenser which permitted the removal of an aqueous distillate. The temperature was raised gradually to 212° C., and the reaction was stopped after 20 cc. of aqueous distillate had been obtained. The product was a liquid.

Example II

The procedure was the same as that described in Example I except the quantity of tall oil was increased to 350 parts, the quantity of sulfur dioxide extract was increased to 260 parts, the maximum temperature was 236° C. and the reaction was stopped after 17.5 cc. of aqueous distillate had been obtained. The product was a liquid.

Example III

The procedure was the same as in Example I except that the quantity of the diethylenetriamine was reduced to 25 parts and the maximum temperature was 232° C. The product was a liquid.

Example IV

The condensation reaction was effected by heating together 25 parts of diethylene triamine, 350 parts of tall oil, and 260 parts of sulfur dioxide extract to a maximum temperature of 235° C. and stopping the reaction after 14 parts of aqueous distillate had been obtained. The product was a liquid.

Example V

The condensation was effected by heating together 38 parts of tetraethylenepentamine, 300 parts of tall oil and 210 parts of sulfur dioxide extract to a maximum temperature of 215° C. and stopping the reaction after 18 parts of aqueous distillate had been obtained. The product was a liquid.

Example VI

The condensation was effected by heating together 60 parts of an amine still residue identified as Polyamine H Special, 300 parts of tall oil and 230 parts of sulfur dioxide extract to a maximum temperature of 225° C. and stopping the reaction after 18 parts of aqueous distillate had been obtained. The product was a liquid.

Example VII

The condensation was effected by heating together 44 parts of dipropylenetriamine, 300 parts of tall oil and 220 parts of sulfur dioxide extract to a maximum temperature of 230° C. and stopping the reaction after 18 parts of aqueous distillate had been obtained. The product was a liquid.

Example VIII

The condensation was effected by heating together 49 parts of hydroxyethyldiethylenetriamine, 300 parts of tall oil and 220 parts of sulfur dioxide extract to a maximum temperature of 225° C. and stopping the reaction after 18 parts of aqueous distillate had been obtained. The product was a liquid.

It is believed that the hydroxyl group in the hydroxyethyldiethylenetriamine remains unreacted.

In the foregoing examples, the weight ratio of acid to amine varies from 5:1 to 14:1.

In the following examples the same general procedures are used as in the preceding examples except that the organic carboxylic acid is a dimer acid consisting essentially of dilinoleic acid.

| Example No. | Amine | Weight Amine | Weight Dimer Acid | Weight Sulfur Dioxide Extract | Max. Temp., ° C. | Aqueous Distillate | Weight Ratio Acid to Amine |
|---|---|---|---|---|---|---|---|
| X | A | 40 | 300 | 215 | 211 | 20.5 | 7.5:1 |
| XI | A | 30 | 300 | 220 | 212 | 16 | 10:1 |
| XII | B | 32 | 300 | 220 | 215 | 16 | 9.4:1 |
| XIII | C | 34 | 300 | 220 | 215 | 16 | 8.8:1 |
| XIV | D | 53 | 300 | 240 | 230 | 20 | 5.7:1 |
| XV | E | 39 | 300 | 220 | 225 | 16 | 7.7:1 |
| XVI | F | 49 | 300 | 240 | 220 | 18 | 6.1:1 |

In the foregoing examples the amines are identified as follows:

A—Diethylenetriamine
    B—Triethylenetetramine
    C—Tetraethylenepentamine
    D—Polyamine H Special
    E—Dipropylenetriamine
    F—Hydroxyethyldiethylenetriamine The method used in the preparation of the dimer acids is set forth in the Journal of the American Oil Chemists Society, 24,65 (March 1947). The specification of these acids are as follows:

| | |
|---|---|
| Neutral equivalent | 290–310 |
| Iodine value | 80–95 |
| Color | Gardner 12 maximum |
| Dimer content | Approximately 85% |
| Trimer and higher | Approximately 12% |
| Monomer | Approximately 3% |

In Examples X to XV, inclusive, the products were all solids. In Example XVI, the product was a liquid.

| Example No. | Amine | Weight Amine | Weight VR–1 Acid | Weight Sulfur Dioxide Extract | Max. Temp., °C. | Aqueous Distillate | Weight Ratio Acid to Amine |
|---|---|---|---|---|---|---|---|
| XVII | A | 16 | 250 | 190 | 228 | 8.4 | 15.7:1 |
| XVIII | A | 14 | 250 | 190 | 227 | 7.2 | 18:1 |
| XIX | A | 12 | 250 | 190 | 230 | 6.2 | 20.8:1 |
| XX | A | 10 | 250 | 190 | 230 | 5.2 | 25:1 |
| XXI | B | 15 | 250 | 190 | 227 | 7 | 16.7:1 |
| XXII | C | 15 | 250 | 190 | 227 | 7 | 16.7:1 |
| XXIII | E | 22 | 250 | 190 | 230 | 9 | 11.4:1 |
| XXIV | F | 25 | 250 | 190 | 220 | 9 | 10:1 |

The VR–1 acid is a mixture of polybasic acids with an average molecular weight of about 1000. It has an average of slightly more than two carboxylic acid groups per molecule. It is a by-product acid, and is a dark amber, rather viscous liquid. A typical sample of VR–1 acid has the following analysis:

| | |
|---|---|
| Acid number | 150 |
| Iodine number | 36 |
| Saponification No. | 172 |
| Unsaponifiable matter, percent | 3.7; 3.5 |
| Moisture content, percent | 0.86 |

In Examples XXI to XXIII, inclusive, the products were all solids. In Examples XVIII to XX and XXIV, inclusive, the products were liquids.

*Example XXV*

The condensation was effected by heating together 37 parts of triethylenetetramine, 250 parts of VR–1 acid, 150 parts of dimer acid and 280 parts of sulfur dioxide extract to a maximum temperature of 230° C. and stopping the reaction after 18 parts of aqueous distillate had been obtained. The product was a solid.

*Example XXVI*

The condensation was effected by heating together 49 parts of hydroxyethyldiethylenetriamine, 166 parts of VR–1 acid, 200 parts of dimer acid and 265 parts of sulfur dioxide extract to a maximum temperature of 225° C. and stopping the reaction after 18 parts of aqueous distillate had been obtained. The product was a solid.

Suitable products can be prepared from polyamine T which is a still residue remaining from the reaction of an alkylene oxide having at least two carbon atoms and ammonia after the removal of the monoamines in which the molar ratio of alkylene oxide to nitrogen does not exceed 3:1. Still residues of this kind are by-products of the preparation of alkylolamines.

Alkylolamines are prepared in general by reacting the alkylene oxides, e.g., ethylene, isopropylene, and isobutylene oxides, with ammonia. These reactions are exothermic and an operating temperature of 50° C. to 60° C. is usually satisfactory. If technical 28% aqueous ammonia is employed, primary, secondary and tertiary amines are obtained in varying proportions, dependent entirely on the alkylene oxide-ammonia ratio. In rectification of the reaction mixture the various amines are separated by distillation. The tertiary alkylolamine, being the highest boiling member, comes over last. In commercial operations there is a gradual accumulation of still bottoms or still residues consisting of materials having boiling points above 280° C. at atmospheric pressures and considerably in excess of the corresponding tertiary alkylolamine. There is no authentic information as to the constitution of these residues.

The preferred alkylene oxide-ammonia reaction product employed as a starting material is derived from the manufacture of commercial triethanolamine by the reaction of ethylene oxide and ammonia. The material is a dark, very viscous, hygroscopic liquid which boils above 244° C. at 50 mm.

The manufacture of the following primary, secondary and tertiary alkylolamines from alkylene oxides and ammonia results in the formation of still residues which would be suitable for the purpose of the invention: diethanolamine, octylethanolamine, cyclohexylethanolamine, dipropanolamine, propylpropanolamine, benzylethanolamine, propyldiethanolamine, tripropanolamine, methyldipropanolamine, cyclohexyldiethanolamine, ethyldicyclohexanolamine, trihexanolamine, 2-amino-2-methyl-1-propanol, octadecyldiethanolamine, and polyethanolamine.

The amines preferably employed in making condensation products in accordance with the invention are polyalkylene or hydroxy polyalkylene polyamines containing at least three amino groups. The preferred amines are those in which the alkylene groups contain either two or three carbon atoms. If the amine contains two terminal primary amino groups and one or more secondary amino groups interconnected by alkylene chains the amine is referred to herein as a polyalkylene polyamine. If one or more of the alkylene groups in the polyalkylene polyamines contains a hydroxyl group it is referred to herein as a hydroxy polyalkylene polyamine. If one or more of the nitrogen atoms in the polyalkylene polyamines has attached thereto a hydroxyalkyl radical it is referred to herein as a hydroxyalkyl or alkanol polyalkylene polyamine. The examples illustrate the aliphatic polyamines which are most readily available commercially at the present time but it will be understood that other aliphatic polyamines can be employed.

In the above examples the polyamine H is a still residue remaining from the production of ethylene amines. In the manufacture of ethylene amines, ethylene dichloride is reacted with ammonia. Reaction conditions vary but in all cases a mixture of the members of the series is obtained. At comparatively low temperatures and pressures predominantly ethylene diamine is formed in low yield. At higher temperatures and pressures the yields are greater and the proportion of the polyethylene polyamines is higher. In the recovery of the higher polyethylene polyamines by distillation there remains a still residue which constitutes the polyamine H consisting of the homologues higher than tetraethylenepentamine. In commercial practice polyamine H is too viscous for handling and 25% of diethylenetriamine is mixed with it to form an easily handled product designated as Polyamine H Special. Similar still residues from the production of other polyalkylene polyamines would be suitable for the purpose of this invention.

The tall oil is a mixture of dissimilar carboxy acids obtained in digesting wood to wood pulp in the paper industry. It is a dark brown, viscous liquid containing a crystalline sediment of abietic acid. From the results of several investigators the following principal constituents of tall oil are indicated: resin acids 30% to 45%, fatty acids 45% to 60%, unsaponifiable matter 6% to 12%. The unsaponifiable portion is a yellow viscous oil containing a waxy or pitchy material. The specifications of the particular grade of tall oil which we prefer to use is as follows:

| | |
|---|---|
| Specific gravity (at 15.5° C.) | .9697 |
| Acid number | 164.0 |
| Saponification number | 173.6 |
| Ester number | 9.4 |
| Percent moisture | 0.0 |
| Percent rosin | 39.2 |
| Percent fatty acids (by difference) | 52.79 |
| Percent linolenic acid | 19.25 |
| Percent linoleic acid | 10.5 |
| Percent oleic acid | 23.04 |
| Percent unsaponifiable | 8.01 |
| Iodine number | 148.83 |
| Thiocyanogen—iodine number | 91.1 |
| Percent saturated fatty acids | none |
| Percent unsaturated fatty acids | 100 |
| Titer test, ° C. | 5.5 |
| Pour test, ° C. | 4.4 |
| Cloud test, ° C. | 10 to 12.8 |

Another organic carboxy acid material which has been used to produce materials satisfactory for the purposes of the invention is a vegetable residue which results from the distillation and acidulation of split soap stock. The ester bodies contained in the material are largely triglycerides. There are small quantities of di- and polybasic acids in the product but the exact composition in this regard is not known. An average specification for this type of material is as follows:

| | |
|---|---|
| Acid value | 45 |
| Saponification value | 150 |
| Iodine value | 100 |
| Color (Bartlett) | 13 |
| Viscosity (Zahn $G_5$ at 75° C.) seconds | 15 |

The material is designated commercially as VR fatty acids.

As examples of organic carboxy acids which have been found to be particularly suitable for the purpose of the invention there may be mentioned linolenic acid, linoleic acid, oleic acid, lauric acid, myristic acid, stearic acid, palmitic acid, other commonly available long chain acyclic acids, and polymeric unsaturated acyclic acids. Of these acids those having a plurality of double bonds (e.g., linolenic and linoleic acids) may also be called drying oil acids. Carbocyclic carboxy acids of the terpene type can also be used as the source of the carboxy acid. These include abietic acid, and related derivatives such as rosin, polymerized rosin, dehydrogenated rosin, and cracked copals.

As illustrations of organic polycarboxy acids which may be employed in preparing the condensation products there are in addition to the dimer acid and the VR-1 acid described in the examples, such acids as adipic acid, suberic acid, azelaic acid and sebacic acid.

The preferred acids can be described as detergent forming acids and contain at least six carbon atoms in the molecule.

The sulfur dioxide extract referred to in the examples is a by-product from the Edeleanu process of refining petroleum in which the undesirable fractions are removed by extraction with liquid sulfur dioxide. After removal of the sulfur dioxide a mixture of hydrocarbons, substantially aromatic in character, remains which is designated in the trade as $SO_2$ extract. Examples of other suitable hydrocarbon vehicles are toluene, xylene, gas, oil, diesel fuel, bunker fuel and coal tar solvents. The above cited examples of solvents are adaptable to azeotropic distillation as would also be any other solvent which is immiscible with water, miscible with the reacting mass and has a boiling point or boiling range in excess of the boiling point of water.

Especially good results have been obtained in the use of condensation products prepared as described in Examples I and XVII.

A list of a few typical uses for the products of the present invention are the following: emulsifying agents, aids in carbonizing; washing agents, dye assistants; dispersing agents in making emulsions and dispersions of various chemicals, such as emulsions of hydrocarbons of various groups of the aliphatic and aromatic series; terpene emulsions; wetting compositions in emulsified form; dispersing agents in making emulsified germicides; color lakes; dye preparations, boring oil; drilling oils; emulsions of various animal and vegetable fats and oils; greasing compositions in emulsified form; lubricating compositions containing vegetable or animal fats and oils; solvents for fats in emulsified form; wetting compositions containing oils in emulsified form; wire-drawing oils in emulsified form, printing inks, writing inks; insecticidal preparations in emulsified form; emulsified dressing compositions containing various substances such as shellac, gums, natural and synthetic resins, fats and oils; emulsified fat liquoring baths; emulsified finishing compositions, emulsified soaking compositions containing neat's-foot oil or other oils to be used as leather fat liquors, emulsified waterproofing compositions; automobile polishes; cleansing compositions containing soaps; compositions for cleansing paint and metal surfaces; degreasing and greasing compositions in emulsified form, detersive and scouring compositions; furniture polishes in emulsified form; metal polishes in emulsified form; scouring compositions for woodwork, linoleum, rugs, and the like; shoe creams and polishes in emulsified form; waterproofing compositions in emulsified form for treating miscellaneous fibrous and other compositions of matter; coating compositions for oilcloth and linoleum; asphaltic paints and varnishes, emulsified paints and varnishes; pigment emulsions; shellac emulsions; emulsified preparations used for the treatment of paper and pulp products; sizing compositions in emulsified form containing rosin, casein, starches and the line; waxing compositions in emulsified creams in emulsified form, emulsified shampoos; lotions, latherless shaving creams, various emulsified perfumes and cosmetics; emulsions containing petroleum or heavy petroleum distillates; emulsified cutting oils for lathe and screw-press work; kerosene emulsions; naphtha emulsions; soluble greases in emulsified form; soluble oils in emulsified form, for lubricating textile machinery, various emulsified textile oils; rubber compositions in emulsified form; special emulsified preparations used for coating, projecting, decorating and other surface treating of rubber merchandise; hand-cleansing compositions in emulsified form; various emulsified cleansing and scouring compositions containing soap; dressing compositions in emulsified form; dispersions used for degreasing and washing raw wool; emulsified preparations for degumming silk; emulsions for soaking silk; emulsified mercerizing baths, special lubricating compositions used in weaving, knitting, warping and winding; emulsions for fire extinguishers; emulsions for the preservation and impregnation of wood; and emulsions for mordanting.

This application is a continuation of our copending application Serial No. 596,816 filed July 10, 1956, now abandoned, which is a continuation-in-part of our application Serial No. 275,014, filed March 5, 1952, now abandoned.

The invention is hereby claimed as follows:

1. A condensation product with the elimination of water of a compound from the group consisting of hydroxy polyalkylene polyamines and polyalkylene polyamines containing at least three amino groups from the group consisting of primary and secondary amino groups and an organic carboxy detergent-forming acid in which a carboxy group is linked to a hydrocarbon group containing at least six carbon atoms from the class consisting of saturated hydrocarbon groups and unsaturated hydrocarbon groups wherein the unsaturation consists of double bonds, the proportions of said organic carboxy acid being a molar excess of at least 1% and not more than 40% over a 1:1 molar ratio of the carboxy groups in the organic carboxy acid to the amino nitrogens of the polyalkylene polyamine, the amino groups being reacted with said acid to produce a product containing no residual basic amino groups.

2. A condensation product with the elimination of water of a polyalkylene polyamine containing at least three amino groups from the group consisting of primary and secondary amino groups and the alkylene groups therein being selected from the group consisting of ethylene and propylene groups and an organic carboxy detergent-forming acid containing one to two carboxy groups linked to a hydrocarbon group containing at least six carbon atoms from the class consisting of saturated hydrocarbon groups and unsaturated hydrocarbon groups wherein the unsaturation consists of double bonds, the proportions of said organic carboxy acid being a molar excess within the range from 1% to 40% over a 1:1 molar ratio of carboxy groups in the organic carboxy acid to amino nitrogens of the polyalkylene polyamine, the condensation being effected at temperatures within the range of 165° C. to 300° C. to produce a product containing no residual basic amino groups.

3. A condensation product with the elimination of water of a polyalkyline polyamine containing at least three amino groups from the group consisting of primary and secondary amino groups and a higher molecular weight, monocarboxylic organic acid consisting of a single carboxy group linked to a hydrocarbon group having at least twelve carbon atoms from the group consisting of saturated hydrocarbon groups and unsaturated hydrocarbon groups wherein the unsaturation consists of double bonds, the proportions of said organic carboxy acid being a molar excess within the range from 1% to 40% over a 1:1 molar ratio of the carboxy groups in the organic carboxy acid to the amino nitrogens of the polyalkylene polyamine, the amino groups being reacted with said acid to produce a product containing no residual basic amino groups.

4. A condensation product with the elimination of water of a polyalkylene polyamine containing at least three amino groups from the group consisting of primary and secondary amino groups and the alkylene groups therein being selected from the group consisting of ethylene and propylene groups, and a higher molecular weight, monocarboxylic organic acid consisting of a single carboxy group linked to a hydrocarbon group having at least twelve carbon atoms from the group consisting of saturated hydrocarbon groups and unsaturated hydrocarbon groups wherein the unsaturation consists of double bonds, the proportions of said organic carboxy acid being a molar excess within the range from 1% to 40% over a 1:1 molar ratio of carboxy groups in the organic carboxy acid to amino nitrogens of the polyalkylene polyamine, the condensation being effected at temperatures within the range of 165° C. to 300° C. to produce a product containing no residual basic amino groups.

5. A condensation product with the elimination of water of a polyalkylene polyamine containing at least three amino groups from the group consisting of primary and secondary amino groups and a dicarboxylic organic acid having at least six carbon atoms consisting of two carboxylic groups linked to an aliphatic hydrocarbon group from the class consisting of saturated aliphatic hydrocarbon groups and unsaturated hydrocarbon groups wherein the unsaturation consists of double bonds, the proportions of said organic carboxy acid being a molar excess within the range from 1% to 40% over a 1:1 molar ratio of the carboxy groups in the organic carboxy acid to the amino nitrogens of the polyalkylene polyamine, the amino groups being reacted with said acid to produce a product containing no residual basic amino groups.

6. A condensation product with the elimination of water of a polyalkylene polyamine containing at least three amino groups from the group consisting of primary and secondary amino groups and the alkylene groups therein being selected from the group consisting of ethylene and propylene groups, and a dicarboxylic organic acid having at least six carbon atoms consisting of two carboxylic groups linked to an aliphatic hydrocarbon group from the class consisting of saturated aliphatic hydrocarbon groups and unsaturated hydrocarbon groups wherein the unsaturation consists of double bonds, the proportions of said organic carboxy acid being a molar excess within the range from 1% to 40% over a 1:1 molar ratio of carboxy groups in the organic carboxy acid to amino nitrogens of the polyalkylene polyamine, the condensation being effected at temperatures within the range of 165° C. to 300° C. to produce a product containing no residual basic amino groups.

7. A condensation product with the elimination of water of a polyalkylene polyamine containing at least three amino groups from the group consisting of primary and secondary amino groups and tall oil, the proportions of tall oil being a molar excess within the range from 1% to 40% over a 1:1 molar ratio of the carboxy groups in tall oil to the amino nitrogens of the polyalkylene polyamine, the amino groups being reacted with the tall oil to produce a product containing no residual basic amino groups.

8. A condensation product with the elimination of water of a polyalkylene polyamine containing at least three amino groups from the group consisting of primary and secondary amino groups and the alkylene groups therein being selected from the group consisting of ethylene and propylene groups, and tall oil, the proportions of tall oil being a molar excess within the range from 1% to 40% of a 1:1 molar ratio of carboxy groups in tall oil to amino nitrogens of the polyalkylene polyamine, the condensation being effected at temperatures within the range of 165° C. to 300° C. to produce a product containing no residual basic amino groups.

9. A condensation product with the elimination of water of a polyalkylene polyamine containing at least three amino groups from the group consisting of primary and secondary amino groups and a dimer of linoleic acid, the proportions of said dimer acid being a molar excess within the range from 1% to 40% over a 1:1 molar ratio of the carboxy groups in the dimer acid to the amino nitrogens of the polyalkylene polyamine, the amino groups being reacted with said acid to produce a product containing no residual basic amino groups.

10. A condensation product with the elimination of water of a polyalkylene polyamine containing at least three amino groups from the group consisting of primary and secondary amino groups and the alkylene groups therein being selected from the group consting of ethylene and propylene groups, and a dimer of linoleic acid, the proportions of said dimer acid being a molar excess within the range from 1% to 40% over a 1:1 molar ratio of carboxy groups in said dimer acid to amino nitrogens of the polyalkylene polyamine, the condensation being effected at temperatures within the range of 165° C. to 300° C. to produce a product containing no residual basic amino groups.

11. A condensation product with the elimination of water of a polyalkylene polyamine containing at least three amino groups from the group consisting of primary and secondary amino groups and an organic carboxy acid comprising a mixture of polybasic organic acids having an average molecular weight of about 1,000 and an average of slightly more than two carboxyl groups per molecule, the proportions of said organic carboxy acid being a molar excess within the range from 1% to 40% over a 1:1 molar ratio of the carboxy groups in the organic carboxy acid to the amino nitrogens of the polyalkylene polyamine, the amino groups being reacted with said acid to produce a product containing no residual basic amino groups.

12. A condensation product with the elimination of water of a polyalkylene polyamine containing at least three amino groups from the group consisting of primary and secondary amino groups and the alkylene groups therein being selected from the group consisting of ethylene and propylene groups, and an organic carboxy acid comprising a mixture of polybasic organic acids having an average molecular weight of about 1,000 and an average of slightly more than two carboxyl groups per molecule, the proportions of said organic carboxy acid being a molar excess within the range from 1% to 40% over a 1:1 molar ratio of carboxy groups in the organic carboxy acid to amino nitrogens of the polyalkylene polyamine, the condensation being effected at temperatures within the range of 165° C. to 300° C. to produce a product containing no basic residual amino groups.

13. The condensation product with the elimination of water of diethylenetriamine and tall oil, the proportions of tall oil being a molar excess of at least 1% and not more than 40% over a 1:1 molar ratio of the carboxy groups in tall oil to the amino nitrogens of diethylenetriamine, the amino groups being reacted with the tall oil acids to produce a product containing no basic amino groups.

14. The condensation product with the elimination of water of diethylenetriamine and an organic carboxy acid comprising a mixture of polybasic organic acids having an average molecular weight of about 1,000 and an average of slightly more than two carboxyl groups per molecule, the proportions of said organic carboxy acid being a molar excess within the range from 1% to 40% over a 1:1 molar ratio of the carboxy groups in the organic carboxy acid to the amino nitrogens of diethylenetriamine, the amino groups being reacted with said acid to produce a product containing no residual basic amino groups.

15. The polymerization condensation reaction product, with the elimination of chemically combined water at temperatures from 165° C. to 300° C., of about 8.6 to 14 parts by weight of tall oil and 1 part by weight of diethylenetriamine.

16. The polymerization condensation reaction product, with the elimination of chemically combined water at temperatures from 165° C. to 300° C., of about 9 parts by weight of tall oil and 1 part by weight of diethylenetriamine.

17. The polymerization condensation reaction product, with the elimination of chemically combined water at temperatures from 165° C. to 300° C., of 5 to 14 parts by weight of tall oil and 1 part by weight of tetraethylenepentamine.

18. The polymerization condensation reaction product, with the elimination of chemically combined water resulting from heating to an ultimate temperature of about 212° C., of about 8.6 to 14 parts by weight of tall oil and 1 part by weight of diethylenetriamine.

19. The polymerization condensation reaction product, with the elimination of chemically combined water, of 5.7 to 25 parts by weight of a mixture of polymerized fatty acids comprising principally dicarboxylic acids containing at least 36 carbon atoms per part of a polyethylene polyamine containing 2 to 5 amino groups.

20. The polymerization condensation reaction product of tall oil reacted with a polyalkylene polyamine containing at least three amino groups from the group consisting of primary and secondary amino groups at a temperature from 165° C. to 300° C., the quantity of said tall oil corresponding to in excess of 3 molecular equivalents of tall oil reacted with one molecular equivalent of said polyalkylene polyamine, said excess being a molar excess within the range from 1% to 40% of a 1:1 molar ratio of carboxy groups in tall oil to amino nitrogens of the polyalkylene polyamine.

21. The polymerization condensation reaction product of tall oil reacted with a diethylenetriamine at a temperature from 165° C. to 300° C., the quantity of said tall oil corresponding to in excess of 3 molecular equivalents of tall oil reacted with one molecular equivalent of said diethylenetriamine said excess being a molar excess within the range from 1% to 40% of a 1:1 molar ratio of carboxy groups in tall oil to amino nitrogens of the diethylenetriamine.

22. The polymerization condensation reaction product resulting from heating to an ultimate temperature of about 165° C. to 300° C. a mixture of one molecular equivalent of diethylenetriamine with from 3.46 to 4.94 molecular equivalents of tall oil.

References Cited in the file of this patent

UNITED STATES PATENTS

| | | |
|---|---|---|
| 2,262,738 | De Groote | Nov. 11, 1941 |
| 2,312,387 | Christmann et al. | Mar. 2, 1943 |
| 2,366,498 | De Groote et al. | Jan. 2, 1945 |
| 2,466,517 | Blair et al. | Apr. 5, 1949 |
| 2,857,331 | Hollingsworth et al. | Oct. 21, 1958 |